No. 783,010. PATENTED FEB. 21, 1905.
J. O. BECKHAM.
SEEDING KNIFE.
APPLICATION FILED NOV. 25, 1904.
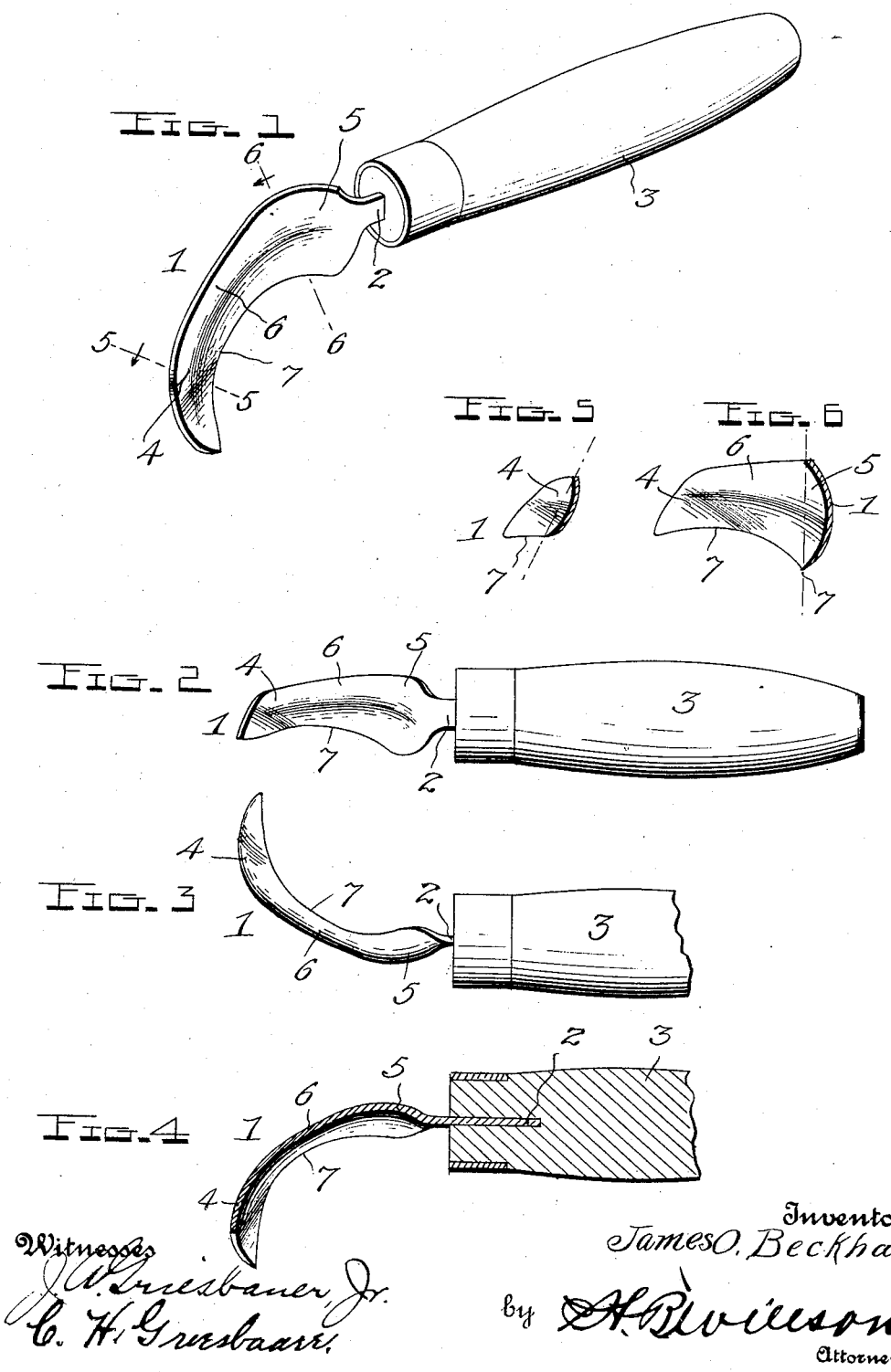

No. 783,010. Patented February 21, 1905.

UNITED STATES PATENT OFFICE.

JAMES OLLIE BECKHAM, OF HENDERSON, NORTH CAROLINA.

SEEDING-KNIFE.

SPECIFICATION forming part of Letters Patent No. 783,010, dated February 21, 1905.

Application filed November 25, 1904. Serial No. 234,261.

*To all whom it may concern:*

Be it known that I, JAMES OLLIE BECKHAM, a citizen of the United States, residing at Henderson, in the county of Vance and State of North Carolina, have invented certain new and useful Improvements in Seeding-Knives; and I do declare the following to be a full, clear, and exact description of the invention, such as will enable others skilled in the art to which it appertains to make and use the same.

My invention relates to improvements in seeding-knives, and more especially to those designed for removing the seeds or stones of peaches and similar fruits.

The object of my invention is to provide a simple and comparatively inexpensive knife of this character by means of which the stone or seed of a peach may be quickly and easily removed without disfiguring the fruit and without the loss of any portion of the same.

With the above and other objects in view the invention consists of certain novel features of construction, combination, and arrangement of parts, as will be more fully described, and particularly pointed out in the appended claims.

In the accompanying drawings, Figure 1 is a perspective view of the knife. Fig. 2 is a side view of the same. Fig. 3 is an edge view of the blade. Fig. 4 is a longitudinal sectional view, and Figs. 5 and 6 are transverse sectional views through the blade, taken, respectively, on the lines 5 5 and 6 6 of Fig. 1.

Referring to the drawings by numeral, 1 denotes the blade of the knife, which is formed at one end with a shank or tang 2. The latter is suitably secured in a handle 3, which may be of any desired form and construction. The blade, which is preferably constructed of steel, is concavo-convex in cross-section and has a general longitudinal curvature, which is more pronounced at its ends 4 and 5 than at its center 6, so as to more nearly conform to the shape of a peach-seed. This longitudinal curvature of the blade causes it to project to one side of the plane of its shank or tang 2, as clearly shown in Fig. 4 of the drawings. The outer end 4 of the blade is also curved or twisted, as seen in Fig. 5—that is, the chord of its transverse curve is disposed at an angle to that of the transverse curve of the portions 5 and 6 of the blade. This twist or curvature, together with the peculiar-shaped longitudinal curvature of the blade, permits it to closely engage the seed of a peach. The width of the blade decreases from its inner end 5 to its outer end 4, which is pointed, as shown, and the cutting edge 7 of the blade curves upwardly or inwardly at its center, as clearly seen in Fig. 2 of the drawings.

The use and advantages of the knife will be readily understood from the foregoing description, taken in connection with the accompanying drawings. In removing a seed from a peach the point of the blade is inserted in the center of the upper end of the peach and the blade is then forced into the same, the blade lying close to the surface of the seed or stone. This may be readily done without injury to the flesh of the peach because of the peculiar twist and curvature of the blade. The blade is then run around the seed to loosen the flesh of the fruit from it, as will be readily understood. When loosened, the seed may be easily removed through the opening in the top of the peach formed by the passage of the blade around the seed. Owing to the longitudinal curvature of the blade and the twist of its outer end, the latter underlies the lower or inner end of the seed, so that it may be readily extracted.

Various changes in the form, proportion, and the minor details of construction may be resorted to without departing from the principle or sacrificing any of the advantages of the invention.

Having thus fully described my invention, what I claim as new, and desire to secure by Letters Patent, is—

1. A seeding-knife having a concavo-convex blade curved longitudinally, the outer end of said blade having the chord of its transverse curve disposed at an angle to the chord of the transverse curve of its inner portion, substantially as described.

2. A seeding-knife having a longitudinally-tapering concavo-convex blade formed with a shank at one end, said blade having a longitudinal curvature and projecting at an angle to the plane of its shank, substantially as described.

In testimony whereof I have hereunto set my hand in presence of two subscribing witnesses.

JAMES OLLIE BECKHAM.

Witnesses:
N. A. GARRETT,
H. O. FALKNER.